United States Patent
Cayssials et al.

(10) Patent No.: US 11,459,115 B2
(45) Date of Patent: Oct. 4, 2022

(54) REAR ENGINE FASTENER FOR AN AIRCRAFT HAVING REDUCED VOLUME WIDTHWISE AND AN AIRCRAFT COMPRISING AT LEAST ONE SUCH REAR ENGINE FASTENER

(71) Applicant: Airbus Operations SAS, Toulouse (FR)

(72) Inventors: Julien Cayssials, Gagnac sur Garonne (FR); Michael Berjot, Colomiers (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 284 days.

(21) Appl. No.: 16/819,941

(22) Filed: Mar. 16, 2020

(65) Prior Publication Data

US 2020/0298986 A1    Sep. 24, 2020

(30) Foreign Application Priority Data

Mar. 18, 2019   (FR) ...................................... 1902776

(51) Int. Cl.
*B64D 27/26*   (2006.01)

(52) U.S. Cl.
CPC ........ *B64D 27/26* (2013.01); *B64D 2027/264* (2013.01); *B64D 2027/268* (2013.01)

(58) Field of Classification Search
CPC ........................... B64D 27/26; B64D 2027/264
See application file for complete search history.

(56) References Cited

U.S. PATENT DOCUMENTS

| 4,725,019 A * | 2/1988 | White ................... B64D 27/26 244/54 |
| 5,351,930 A * | 10/1994 | Gwinn ...................... F16F 1/40 244/54 |
| 7,325,770 B2 | 2/2008 | Chevalier et al. |
| 2009/0032673 A1* | 2/2009 | Dron ..................... B64D 27/26 248/557 |
| 2016/0122029 A1* | 5/2016 | Serra ..................... B64D 27/26 244/54 |

FOREIGN PATENT DOCUMENTS

EP    0583158 A1    2/1994

OTHER PUBLICATIONS

French Search Report; priority document.

* cited by examiner

*Primary Examiner* — Richard R. Green
*Assistant Examiner* — Steven J Shur
(74) *Attorney, Agent, or Firm* — Greer, Burns & Crain, Ltd.

(57) ABSTRACT

A rear engine fastener for an aircraft connecting a primary structure and an engine of an aircraft, the rear engine fastener comprising a support configured to be connected to the primary structure, at least one main shackle connected to the support by first and second support link pins, which are symmetrical relative to a vertical longitudinal plane, and to the engine by a first lateral engine link pin and by a central engine link pin, and at least one secondary shackle connected to the engine by a second lateral engine link pin and to the main shackle by a secondary link pin.

7 Claims, 7 Drawing Sheets

REAR ENGINE FASTENER FOR AN AIRCRAFT HAVING REDUCED VOLUME WIDTHWISE AND AN AIRCRAFT COMPRISING AT LEAST ONE SUCH REAR ENGINE FASTENER

CROSS-REFERENCES TO RELATED APPLICATIONS

This application claims the benefit of the French patent application No. 1902776 filed on Mar. 18, 2019, the entire disclosures of which are incorporated herein by way of reference.

BACKGROUND OF THE INVENTION

The present application relates to a rear engine fastener for an aircraft having reduced volume widthwise, as well as to an aircraft comprising at least one such rear engine fastener.

Figure 1:
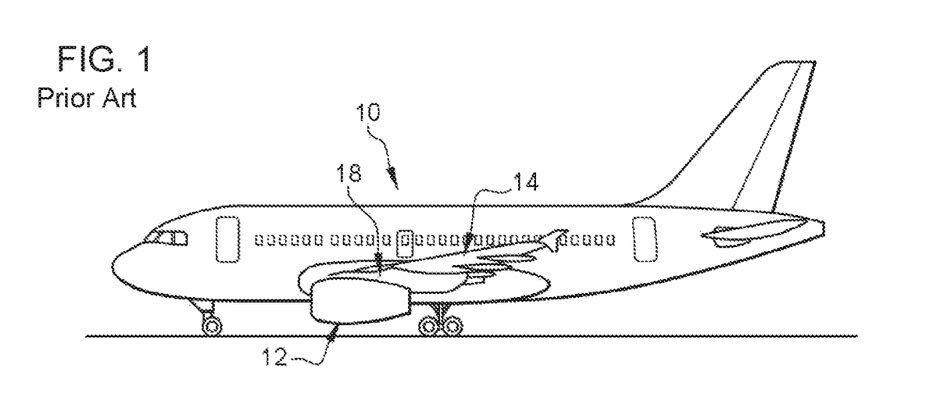
FIG. 1 is a side view of a known aircraft.
Figure 2:
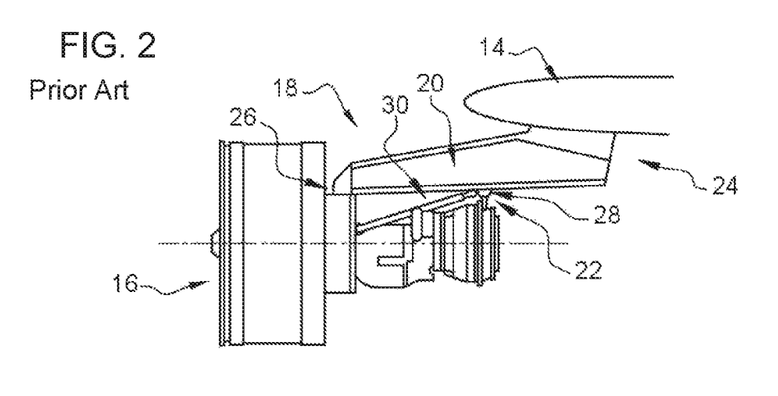
FIG. 2 is a side view of a known powerplant.

According to one embodiment shown in FIGS. 1 and 2, an aircraft 10 comprises a plurality of powerplants 12 positioned under each wing 14 of the aircraft. Each powerplant 12 comprises an engine 16, a nacelle (not shown in FIG. 2) positioned around the engine 16, as well as a strut 18 connecting the engine 16 and the wing 14. The strut 18 comprises a primary structure 20 that is connected to the engine 16 by an engine fastener 22 and to the wing 14 by a wing unit fastener 24.

For the present invention, a longitudinal direction is substantially parallel to the axis of rotation A16 of the engine. A vertical longitudinal plane is a vertical plane passing through the axis of rotation A16 of the engine. A transverse plane is a plane perpendicular to the axis of rotation A16 of the engine. A horizontal transverse direction is a direction horizontal and perpendicular to the axis of rotation A16 of the engine.

The engine fastener 22 comprises a front engine fastener 26, a rear engine fastener 28 and a pair of thrust connecting rods 30 for absorbing the thrust forces.

Figure 3:
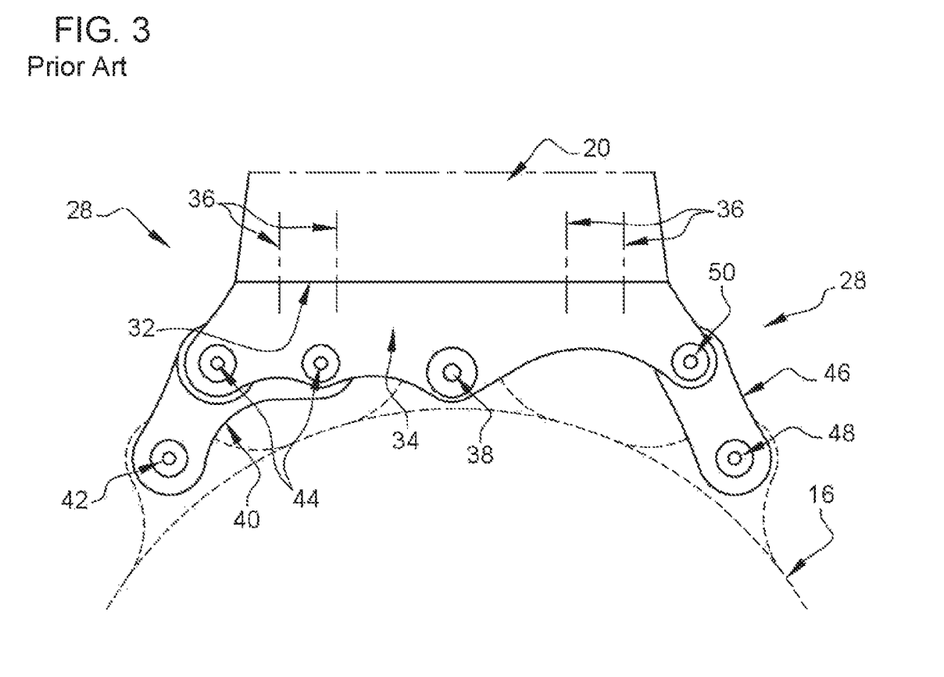
FIG. 3 is a front view of a rear engine fastener that shows an embodiment of the prior art.
Figure 4:
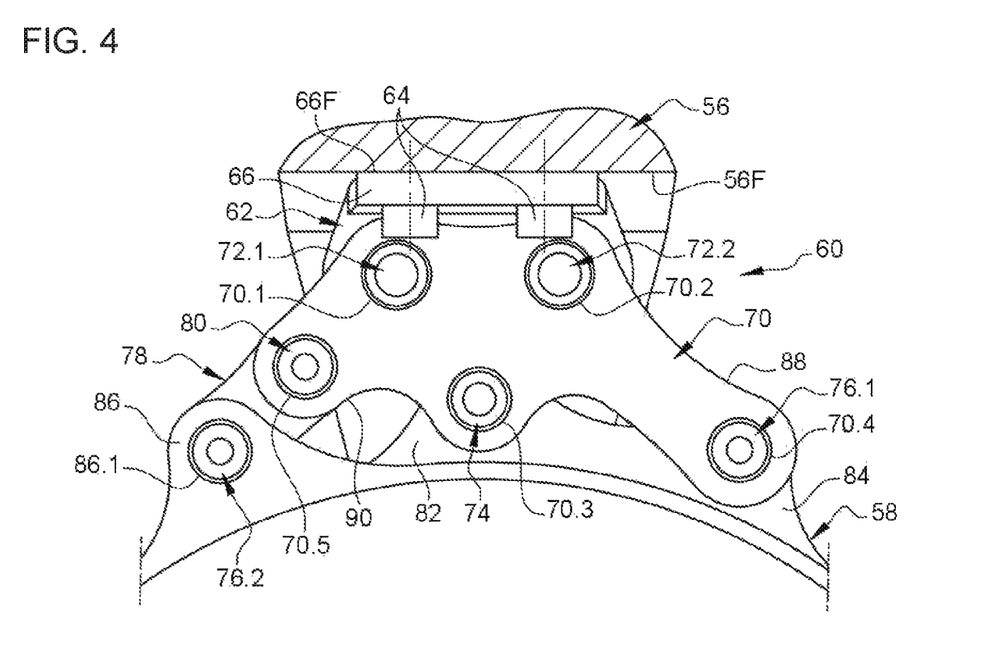
FIG. 4 is a front view of a rear engine fastener that shows a first embodiment of the invention.
Figure 5:
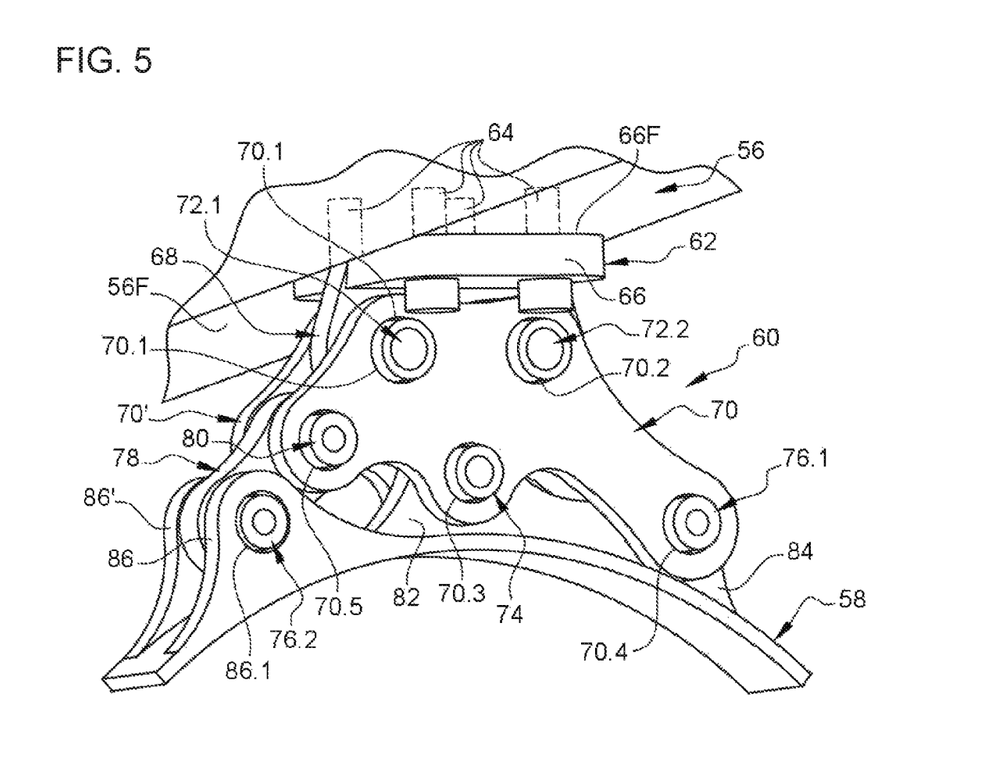
FIG. 5 is a perspective view of the rear engine fastener shown in FIG. 4.

According to one embodiment shown in FIG. 3, for the rear engine fastener 28, the primary structure 20 comprises a base plate 32 approximately positioned in a horizontal plane. The rear engine fastener 28 comprises a cross-beam 34 connected to the primary structure 20 by link elements 36 and to the engine 16 by a central engine link pin 38, a first shackle 40 connected to the engine 16 by a first lateral engine link pin 42 and to the cross-beam 34 by two beam link pins 44, as well as a second shackle 46 connected to the engine by a second lateral engine link pin 48 and to the cross-beam 34 by a beam link pin 50.

The link pins 38, 42, 44, 48, 50 are substantially parallel to each other and to the longitudinal direction.

According to this embodiment, the first shackle 40 absorbs tension/compression forces and the engine torque. The second shackle 46 absorbs tension/compression forces.

The first and second shackles 40, 46 are connected to the cross-beam 34 by three beam link pins 44, 50 that are spaced apart and approximately aligned with the central engine link pin 38 in a horizontal transverse direction. This arrangement results in significant volume in the transverse direction. Thus, the lower part of the primary structure is very wide, adversely affecting the aerodynamic performance of the strut 18.

The aim of the present invention is to overcome all or some of the disadvantages of the prior art.

SUMMARY OF THE INVENTION

To this end, the aim of the invention is a rear engine fastener for an aircraft connecting a primary structure and an engine of an aircraft, the rear engine fastener comprising a support configured to be connected to the primary structure, at least one central attachment lug rigidly connected to the engine, at least one first lateral attachment lug rigidly connected to the engine, at least one second lateral attachment lug rigidly connected to the engine, the first and second lateral attachment lugs being disposed on either side of the central attachment lug, at least one main shackle connected to the support by first and second support link pins and to the first lateral attachment lug by a first lateral engine link pin, at least one secondary shackle connected to the second lateral attachment lug by a second lateral engine link pin.

According to the invention, the main shackle is connected to the central attachment lug by a central engine link pin positioned in a vertical longitudinal plane, the first and second support link pins are symmetrically positioned relative to the vertical longitudinal plane and the secondary shackle is connected to the main shackle by a secondary link pin.

According to the invention, the rear engine fastener only comprises two support link pins aligned in a horizontal transverse direction. For this reason, the rear engine fastener is more compact in a transverse direction, in the vicinity of the base of the primary structure, which allows the width of the strut to be reduced and therefore the aerodynamic performance to be improved.

According to another feature, the support comprises at least one mounting plate having a bearing surface configured to be pressed against the primary structure and through orifices for housing link elements, as well as at least one web, produced as a single piece with the mounting plate and positioned in an approximately transverse plane, having first and second through holes for the first and second support link pins.

According to another feature, each main shackle is in the form of a plate approximately positioned in a transverse plane and comprises five orifices, including first and second orifices for housing the first and second support link pins, a third orifice for housing the central engine link pin, a fourth orifice for housing the first lateral engine link pin and a fifth orifice for housing the secondary link pin.

According to another feature, each main shackle comprises an approximately triangular central part with three rounded vertices, in the vicinity of which the first, second and third orifices are positioned, a first long extension, at a free end of which the fourth orifice is positioned, as well as a second short extension, at a free end of which the fifth orifice is positioned.

According to another feature, each secondary shackle is in the form of a plate, approximately positioned in a transverse plane, of oblong shape comprising first and second rounded ends, in the vicinity of which first and second holes are positioned for housing the second lateral engine link pin and the secondary link pin.

According to another feature, the first and second support link pins each integrate a ball joint link for allowing movement of the engine.

According to another feature, the first and second lateral engine link pins each integrate a ball joint link for allowing movement of the engine.

According to another feature, the rear engine fastener comprises a single web, two main mounting plates that are parallel to each other, spaced apart and disposed on either side of the web, a single secondary mounting plate interposed between the two main mounting plates, a single central attachment lug interposed between the two main mounting plates, a single first lateral attachment lug interposed between the two main mounting plates, as well as two second lateral attachment lugs that are parallel to each other, spaced apart and disposed on either side of the secondary mounting plate.

According to another feature, the rear engine fastener comprises two webs that are parallel to each other and spaced apart, a single main mounting plate positioned between the two webs, two secondary mounting plates that are parallel to each other, spaced apart and disposed on either side of the main mounting plate, two central attachment lugs that are parallel to each other, spaced apart and disposed on either side of the main mounting plate, two first lateral attachment lugs that are parallel to each other, spaced apart and disposed on either side of the main mounting plate, as well as a single second lateral attachment lug positioned between the secondary mounting plates.

A further aim of the invention is an aircraft comprising at least one rear engine fastener according to one of the preceding features.

BRIEF DESCRIPTION OF THE DRAWINGS

Further features and advantages will become apparent from the following description of the invention, which is provided solely by way of an example, with reference to the accompanying drawings, in which.

DETAILED DESCRIPTION OF THE PREFERRED EMBODIMENTS

FIGS. 4 to 7 show a primary structure 56 of an aircraft connected to an engine 58 by a rear engine fastener 60.

According to one configuration, the primary structure 56 comprises a substantially flat base plate 56F for rigidly connecting the rear engine fastener 60.

The rear engine fastener 60 comprises a support 62 connected to the primary structure 56 by elements 64 for linking to the primary structure 56. This support 62 comprises at least one mounting plate 66 that has a bearing surface 66F pressed against the base plate 56F of the primary structure 56 and through orifices for housing the link elements 64, as well as at least one web 68, produced as a single piece with the mounting plate 66, positioned in an approximately transverse plane.

The rear engine fastener 60 comprises at least one main shackle 70, in the form of a plate approximately positioned in a transverse plane, connected to the web 68 by first and second support link pins 72.1, 72.2, as well as to the engine 58 by a central engine link pin 74 and by a first lateral engine link pin 76.1.

The rear engine fastener 60 comprises at least one secondary shackle 78, in the form of a plate approximately positioned in a transverse plane, connected to the main shackle 70 by a secondary link pin 80 and to the engine 58 by a second lateral engine link pin 76.2.

The first and second support link pins 72.1, 72.2, the central engine link pin 74, the first and second lateral engine link pins 76.1, 76.2 and the secondary link pin 80 are parallel to each other and oriented in a direction approximately parallel to the longitudinal direction.

The first and second support link pins 72.1, 72.2 are symmetrically positioned relative to the vertical longitudinal plane.

The web 68 of the support 62 comprises first and second through holes 68.1, 68.2, respectively, for the first and second support link pins 72.1, 72.2. Each main shackle 70 comprises first and second orifices 70.1, 70.2 for housing the first and second support link pins 72.1, 72.2. The first and second support link pins 72.1, 72.2 each integrate a ball joint link for allowing movement of the engine 58. The first and second support link pins 72.1, 72.2 are not described further since they can be identical to the beam link pins 44, 50 of the prior art.

The central engine link pin 74 is positioned in the vertical longitudinal plane. The first and second lateral engine link pins 76.1, 76.2 are symmetrically positioned relative to the vertical longitudinal plane.

The engine 58 comprises at least one central attachment lug 82, positioned in a transverse plane, which has a through hole 82.1 for housing the central engine link pin 74. The central engine link pin 74 is positioned in the vertical longitudinal plane.

Each main shackle 70 comprises a third orifice 70.3 for housing the central engine link pin 74.

The central engine link pin 74 is not described further since it can be identical to the central engine link pin 38 of the prior art.

The engine 58 comprises at least one first lateral attachment lug 84, positioned in a transverse plane, which has a first through hole 84.1 for housing the first lateral engine link pin 76.1. Each main shackle 70 comprises a fourth orifice 70.4 for housing the first lateral engine link pin 76.1.

The engine 58 comprises at least one second lateral attachment lug 86, positioned in a transverse plane, which has a second through hole 86.1 for housing the second lateral engine link pin 76.2. Each secondary shackle 78 comprises a first hole 78.1 for housing the second lateral engine link pin 76.2.

The first and second through holes 84.1, 86.2 are positioned so that the first and second lateral engine link pins 76.1, 76.2 are symmetrically disposed relative to the vertical longitudinal plane.

The first and second lateral engine link pins 76.1, 76.2 each integrate a ball joint link for allowing movement of the engine 58. The first and second lateral engine link pins 76.1, 76.2 are not described further since they can be identical to the first and second lateral engine link pins 42, 48 of the prior art.

Each main shackle 70 comprises a fifth orifice 70.5 for housing the secondary link pin 80. Each secondary shackle 78 comprises a second hole 78.2 for housing the secondary link pin 80.

According to one configuration, the secondary link pin 80 is identical to the second lateral engine link pin 76.2.

According to one embodiment, each secondary shackle 78 is of oblong shape, which has first and second rounded ends, in the vicinity of which the first and second holes 78.1, 78.2 are positioned.

Each shackle 70 comprises an approximately triangular central part with three rounded vertices, in the vicinity of which the first, second and third orifices 70.1 to 70.3 are positioned, a first long extension 88, at a free end of which the fourth orifice 70.4 is positioned, as well as a second short extension 90, at a free end of which the fifth orifice 70.5 is positioned.

Figure 6:
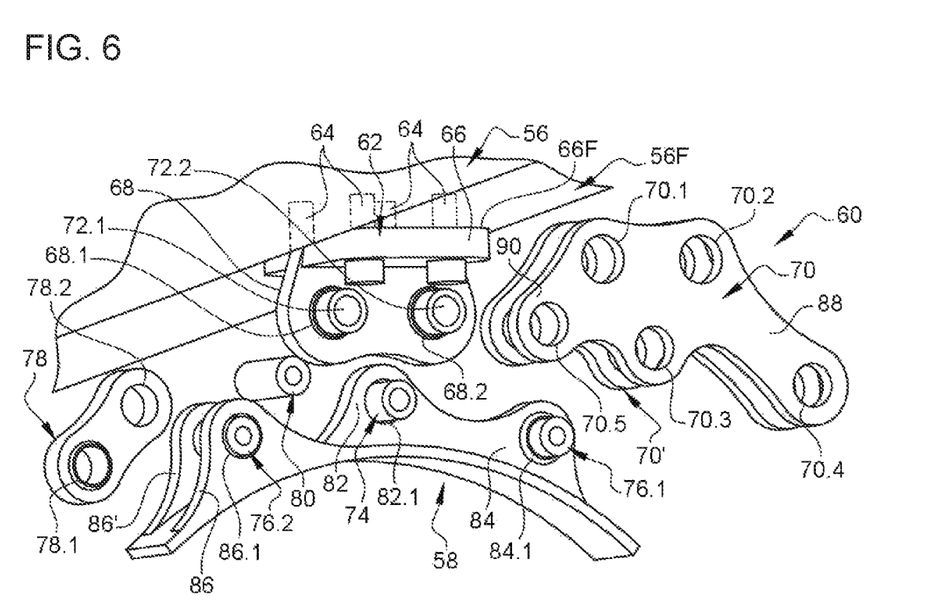
FIG. 6 is an exploded perspective view of the rear engine fastener shown in FIG. 4.

According to a first embodiment shown in FIG. 6, the rear engine fastener 60 comprises a single web 68, two main mounting plates 70, 70' that are parallel to each other, spaced apart and disposed on either side of the web 68, a single secondary mounting plate 78 interposed between the two main mounting plates 70, 70', a single central attachment lug 82 interposed between the two main mounting plates 70, 70', a single first lateral attachment lug 84 interposed between the two main mounting plates 70, 70', as well as two second lateral attachment lugs 86, 86' that are parallel to each other, spaced apart and disposed on either side of the secondary mounting plate 78.

Figure 7:
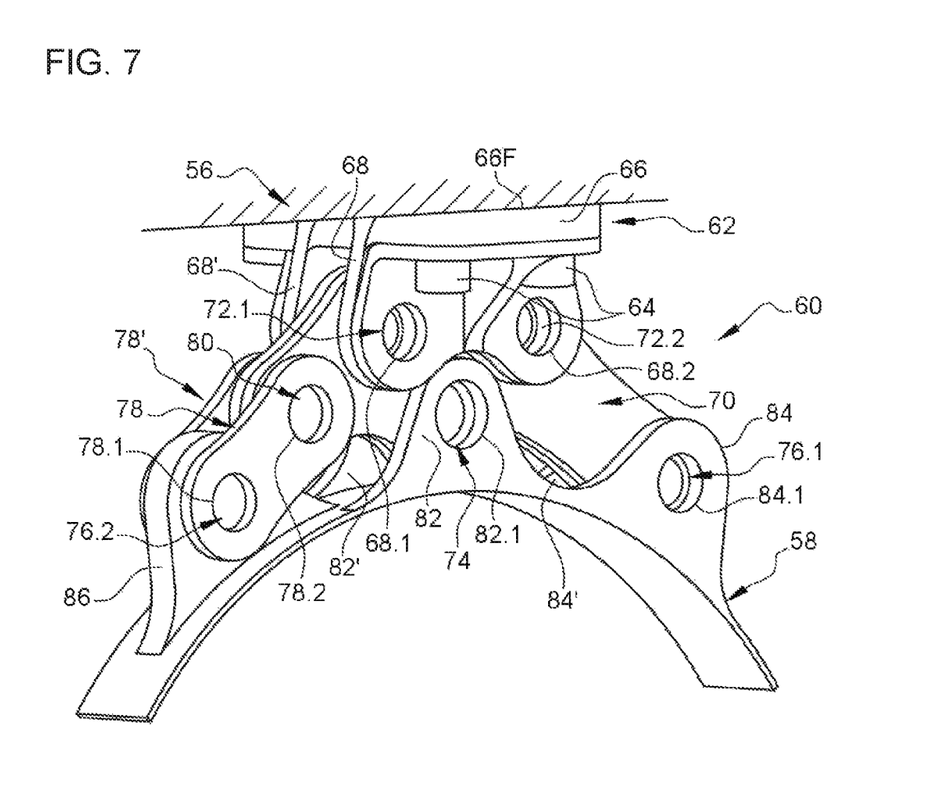
FIG. 7 is a perspective view of a rear engine fastener that shows a second embodiment of the invention.

According to a second embodiment shown in FIG. 7, the rear engine fastener 60 comprises two webs 68, 68' that are parallel to each other and spaced apart, a single main mounting plate 70 positioned between the two webs 68, two secondary mounting plates 78, 78' that are parallel to each other, spaced apart and disposed on either side of the main mounting plate 70, two central attachment lugs 82, 82' that are parallel to each other, spaced apart and disposed on either side of the main mounting plate 70, two first lateral attachment lugs 84, 84' that are parallel to each other, spaced apart and disposed on either side of the main mounting plate 70, as well as a single second lateral attachment lug 86 positioned between the secondary mounting plates 78, 78'.

Irrespective of the embodiment, the engine 58, more specifically its casing, has asymmetrical lateral and central attachment lugs, with the engine 58 comprising either a single central attachment lug 82, a single first lateral attachment lug 84 and two second lateral attachment lugs 86, or two second central attachment lugs 82, 82', two first lateral attachment lugs 84, 84' and a single second lateral attachment lug 86.

Contrary to the prior art, which provides three link pins aligned in a horizontal transverse direction under the primary structure 56, the rear engine fastener of the invention only provides two support link pins 72.1, 72.2 aligned in a horizontal transverse direction. Thus, the rear engine fastener 60 is more compact in a transverse direction, in the vicinity of the base of the primary structure 56, which allows the width of the strut to be reduced and therefore the aerodynamic performance to be improved.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A rear engine fastener for an aircraft connecting a primary structure and an engine of an aircraft, said rear engine fastener comprising:
   a support configured to be connected to the primary structure,
   at least one central attachment lug rigidly connected to the engine,
   at least one first lateral attachment lug rigidly connected to the engine,
   at least one second lateral attachment lug rigidly connected to the engine,
      the first and second lateral attachment lugs being disposed on either side of the central attachment lug,
   at least one main shackle connected to the support by first and second support link pins and to the first lateral attachment lug by a first lateral engine link pin,
   at least one secondary shackle connected to the second lateral attachment lug by a second lateral engine link pin,
   wherein the main shackle is connected to the central attachment lug by a central engine link pin positioned in a vertical longitudinal plane,
   wherein the first and second support link pins are symmetrically positioned relative to the vertical longitudinal plane, and
   wherein the secondary shackle is connected to the main shackle by a secondary link pin,
   wherein the support comprises at least one mounting plate having a bearing surface configured to be pressed against the primary structure and through orifices for housing link elements, as well as at least one web, produced as a single piece with the at least one mounting plate, positioned in an approximately transverse plane, having first and second through holes for the first and second support link pins, and
   wherein the rear engine fastener further comprises:
      two webs that are parallel to each other and spaced apart,
      a single main mounting plate positioned between the two webs,
      two secondary mounting plates that are parallel to each other, spaced apart and disposed on either side of the main mounting plate,
      two central attachment lugs that are parallel to each other, spaced apart and disposed on either side of the main mounting plate,
      two first lateral attachment lugs that are parallel to each other, spaced apart and disposed on either side of the main mounting plate, and
      a single second lateral attachment lug positioned between the secondary mounting plates.

2. The rear engine fastener for an aircraft according to claim 1, wherein each main shackle is formed as a plate approximately positioned in a transverse plane and comprises five orifices, including first and second orifices for housing the first and second support link pins, a third orifice for housing the central engine link pin, a fourth orifice for housing the first lateral engine link pin and a fifth orifice for housing the secondary link pin.

3. The rear engine fastener for an aircraft according to claim 2, wherein each main shackle comprises an approximately triangular central part with three rounded vertices, in a vicinity of which the first, second and third orifices are positioned, a first long extension, at a free end of which the fourth orifice is positioned, as well as a second short extension, at a free end of which the fifth orifice is positioned.

4. The rear engine fastener for an aircraft according to claim 1, wherein each secondary shackle is formed as a plate, approximately positioned in a transverse plane, of oblong shape comprising first and second rounded ends, in a vicinity of which first and second holes are positioned for housing the second lateral engine link pin and the secondary link pin.

5. The rear engine fastener for an aircraft according to claim 1, wherein the first and second support link pins each integrate a ball joint link for allowing movement of the engine.

6. The rear engine fastener for an aircraft according to claim 1, wherein the first and second lateral engine link pins each integrate a ball joint link for allowing movement of the engine.

7. An aircraft comprising at least one rear engine fastener according to claim 1.

* * * * *